UNITED STATES PATENT OFFICE.

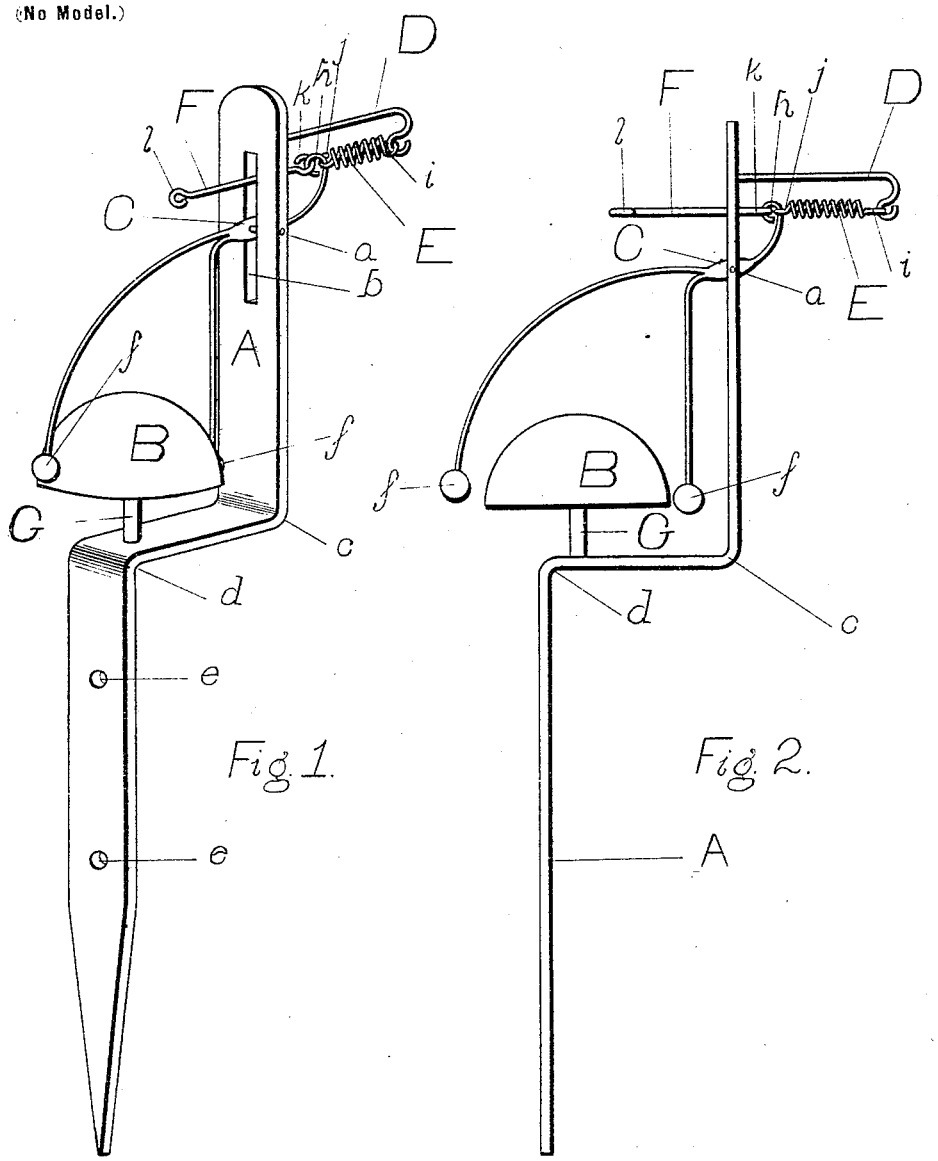

HENRI PERRIN, OF WATERBURY, CONNECTICUT.

FISHING ALARM DEVICE.

SPECIFICATION forming part of Letters Patent No. 632,823, dated September 12, 1899.

Application filed May 10, 1899. Serial No. 716,262. (No model.)

*To all whom it may concern:*

Be it known that I, HENRI PERRIN, a citizen of the United States, residing at Waterbury, in the county of New Haven and State of Connecticut, have invented certain new and useful Improvements in Fishing Alarm Devices; and I do declare the following to be a full, clear, and exact description of the invention, such as will enable others skilled in the art to which it appertains to make and use the same.

My invention relates to an improved alarming device for fishing-tackle; and the object of my improvement is to supplement an ordinary fishing-tackle with an alarm which will warn the operator of the tackle of any interference with the bait or hook attached to the end of the line. I attain this object by the mechanism illustrated in the accompanying drawings, in which—

Figure 1 is a detailed view in perspective of the alarm device. Fig. 2 is a side elevation of the same.

Similar letters refer to similar parts throughout both views.

The angle-plate A is the frame and constitutes the means of securing the device either to the side of a boat or wharf through the screw-holes $e$ and $e'$ or to the ground by inserting therein the pointed end thereof. The forked arm C, to the upper end of which is attached the coiled spring E and to the extreme end of each of the branches thereof are attached the hammers $f$ and $f'$, is secured to the frame A by the pin $a$ and is prevented from having any lateral motion by the sides of the slot $b$, through which it extends. The hook-arm D engages the spring E by its hook end and is secured to the frame A at its other and opposite end. The coiled spring E is attached to and extends from the hook end of the hook-arm D to the upper end of the forked arm C, to which it is also attached. The extension-wire F extends through the slot $b$ in the frame A and is secured to the upper end of the forked arm C by the loop $k$. The alarm-bell B is secured to the frame A by the post G.

Having secured this device to the side of a boat or wharf or to the ground, an ordinary fishing-line is attached to the loop $l$ on the end of the extension-arm F. A slight pull on said arm will cause the branch of the forked arm C, which supports the hammer $f$, to vibrate backward and forward and being situated very close to the alarm-bell B will strike against it, and thus cause it to ring and alarm the operator or fisherman. Should there be a single and strong pull at said loop $l$, so as not to give the hammer $f$ an opportunity to vibrate and make an alarm, then the hammer $f'$ would be thrown against the alarm-bell and the same result accomplished. By these means it may readily be seen that any interference with a bait attached to a tackle which is connected with said loop $l$, whether the interference is greater or less, will cause the alarm-bell to be rung and the fisherman to be apprised of the presence of the disturber.

Having fully described my invention, what I claim as new, and desire to secure by Letters Patent, is—

A fishing alarm device, consisting of a frame A provided with the screw-holes $e$ and $e'$, the bell B attached to said frame by the post G, the forked arm C extending through a slot $b$ in said frame and having a hammer on the extreme end of each branch thereof and a loop $h$ on its other and opposite end and hinged to said frame through said slot by a pin $a$, a hook-arm D secured to said frame and provided with a hook to engage and hold one end of a coiled spring E the other end of which spring is secured to the loop $h$ on the end of the forked arm C, and the extension-wire F, all substantially as described and for the purposes set forth.

HENRI PERRIN.

Witnesses:
G. A. HOSKINS,
EDWARD C. THOMAS.